United States Patent
Nikazm et al.

(10) Patent No.: US 7,683,573 B2
(45) Date of Patent: Mar. 23, 2010

(54) SYSTEM AND METHOD FOR POWERING DOCKED PORTABLE INFORMATION HANDLING SYSTEM

(75) Inventors: Ayedin Nikazm, Austin, TX (US); Andrew T. Sultenfuss, Leander, TX (US); Merle Wood, Round Rock, TX (US)

(73) Assignee: Dell Products L.P., Round Rock, TX (US)

(*) Notice: Subject to any disclaimer, the term of this patent is extended or adjusted under 35 U.S.C. 154(b) by 493 days.

(21) Appl. No.: 11/830,039

(22) Filed: Jul. 30, 2007

(65) Prior Publication Data

US 2009/0033287 A1 Feb. 5, 2009

(51) Int. Cl.
*H02J 7/00* (2006.01)
*G06F 1/16* (2006.01)
*G06F 13/00* (2006.01)

(52) U.S. Cl. .............. 320/113; 710/303; 710/304

(58) Field of Classification Search .......... 320/106, 320/107, 110, 111, 113, 115, 135, 137; 361/681, 361/683, 686; 710/300, 303, 304
See application file for complete search history.

(56) References Cited

U.S. PATENT DOCUMENTS

| 5,323,291 | A | | 6/1994 | Boyle et al. ............... 361/683 |
|---|---|---|---|---|
| 5,886,424 | A | * | 3/1999 | Kim ............................. 307/64 |
| 5,930,110 | A | * | 7/1999 | Nishigaki et al. ...... 361/679.43 |
| 6,005,368 | A | | 12/1999 | Frame ......................... 320/113 |
| 2005/0083247 | A1 | * | 4/2005 | Juenger ....................... 345/2.2 |
| 2008/0082697 | A1 | * | 4/2008 | Yang et al. .................. 709/250 |
| 2008/0294830 | A1 | * | 11/2008 | Bhatia et al. ................ 710/304 |

* cited by examiner

*Primary Examiner*—Patrick J Assouad
*Assistant Examiner*—M'Baye Diao
(74) *Attorney, Agent, or Firm*—Hamilton & Terrile, LLP; Robert W. Holland

(57) ABSTRACT

A portable information handling system powered through a docking station charges an internal battery based on available power sensed at the docking station and communicated to a charger of the information handling system. A dock sensor on the information handling system selectively interfaces a local power sensor if the information handling system is not docked or a docking station sensor if the information handling system is docked. Available power sensed at the docking station is communicated to a battery charger of the information handling system by a differential wire pair interfaced through a docking connector.

19 Claims, 5 Drawing Sheets

SYSTEM AND METHOD FOR POWERING DOCKED PORTABLE INFORMATION HANDLING SYSTEM

BACKGROUND OF THE INVENTION

1. Field of the Invention

The present invention relates in general to the field of information handling system power, and more particularly to a system and method for powering docked portable information handling systems.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

The increased capability of processing components used to build information handling systems has resulted in a trend towards reducing the footprint of information handling systems. In particular, this trend is illustrated in the increased adoption by end users of portable information handling systems as replacements for desktop or other types of fixed systems. Portable information handling systems have an integrated display and power system so that an end user can use the system independent of assets external to the system's chassis, such as external peripherals and power adapters. End users have increasingly opted for the convenience of portability, especially as improved component performance has made the performance of portable information handling system comparable to desktop systems. However, portable information handling systems cannot operate indefinitely independent of external assets. For instance, the battery that powers portable information handling systems typically must recharge with an external power source after a couple of hours of operation. In addition, end users tend to periodically interface with peripherals, such as external displays, printers and keyboards. External peripherals sometimes provide a more convenient interface for an information handling system, such as a display with a larger viewable area than an integrated display or a keyboard with a more comfortable keypad than an integrated keyboard.

One convenient way for end users to interface a portable information handling system with external peripherals is to use a docking station. A docking station typically has a cradle that accepts a portable information handling system, such as with a connector sized to couple to a connector at the back of the information handling system. The docking station connector interfaces the portable information handling system with peripherals that are coupled to the docking station, such as an external display, an external keyboard or an external power source. Essentially, the docking station converts the portable information handling into a desktop system when an end user slides the portable system into the docking station cradle. The docking station interfaces with an AC power source and includes an adapter that converts the AC power into DC power for use by the portable information handling system's internal power system. Generally, the portable information handling system's own external AC adapter cannot connect to the portable system when the portable system is docked. The portable information handling system typically includes charger integrated circuit that uses the docking station external power to run the portable information handling system and also to charge the internal battery.

One difficulty with a docking station is that each information handling system peripheral function supported by the docking station has to have pins in the connector to interface with the information handling system. Each docking station pin adds to the expense and complexity of the information handling system, such as by taking up space on printed circuit boards of the information handling system. In the case of the power system, multiple docking station pins are typically used. For example, to prevent the information handling system battery charger from exceeding the docking station AC adapter power rating, the battery charger generally has to measure the total power used by the portable information handling system and the docking station electronics. This measurement typically requires routing of the docking station power source voltage straight to the portable information handling system through a sense element and then back to the docking station. The sense element measures the total power consumed by the docking station and the portable information handling system but uses an extra set of pins for power communication. If an actual voltage measurement is not made by the charger, an estimate of power used by the docking station may be used, however, the estimate will generally have to include excess power to avoid exceeding the docking station capability. The use of a higher powered adapter in the docking station gives more room for fudging power consumption, however, typically increases the cost of the docking station.

SUMMARY OF THE INVENTION

Therefore a need has arisen for a system and method which powers a docked portable information handling system while also measuring docking station power consumption.

In accordance with the present invention, a system and method are provided which substantially reduce the disadvantages and problems associated with previous methods and systems for powering a docked portable information handling system. Available power sensed at the docking station is communicated to the information handling system to apply to determine the amount of power for charging a battery of the information handling system.

More specifically, a portable information handling system couples to a docking station with opposing docking connectors that communicate information and power. A power source, such as an AC adapter, associated with the docking station provides power to electronic components of the docking station and to the information handling system. A power sensor integrated in the docking station senses available power, such as by sensing the amount of power used by the docking electronics and information handling system with a current sense resistor circuit. A power sensor line, such as a differential pair, forwards the sensed available power to a charger of the information handling system, such as at a current sense amplifier, which applies the power sensed at the docking station to determine the amount of power available for charging a battery of the information handling system. A dock sensor, such as a MOSFET switch, senses docking of the information handling system to disconnect the information handling systems power sensor and replace its signal with the docking station's power sensor signal. Upon undocking, the docking sensor reconnects the information handling system's power sensor to the charger to determine the amount of power available for charging the battery from the information handling system's AC adapter.

The present invention provides a number of important technical advantages. One example of an important technical advantage is that the cost of a portable information handling system is reduced by avoiding the additional power pins needed to route power from the docking station to the information handling system and back to the docking station. In contrast, measuring the power at the docking station and communicating the sensed power through a differential pair of wires to the portable information handling system reduces costs by avoiding the routing of two power source rails within the portable information handling system motherboard. The power sensor of the portable information handling system is selectively interfaced with the power rail when power is supplied by an AC adapter interfaced directly with the portable information handling system instead of through the docking station.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Charging an information handling system battery based upon available power sensed at a docking station avoids multiple power rail interfaces between the information handling system and the docking station. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
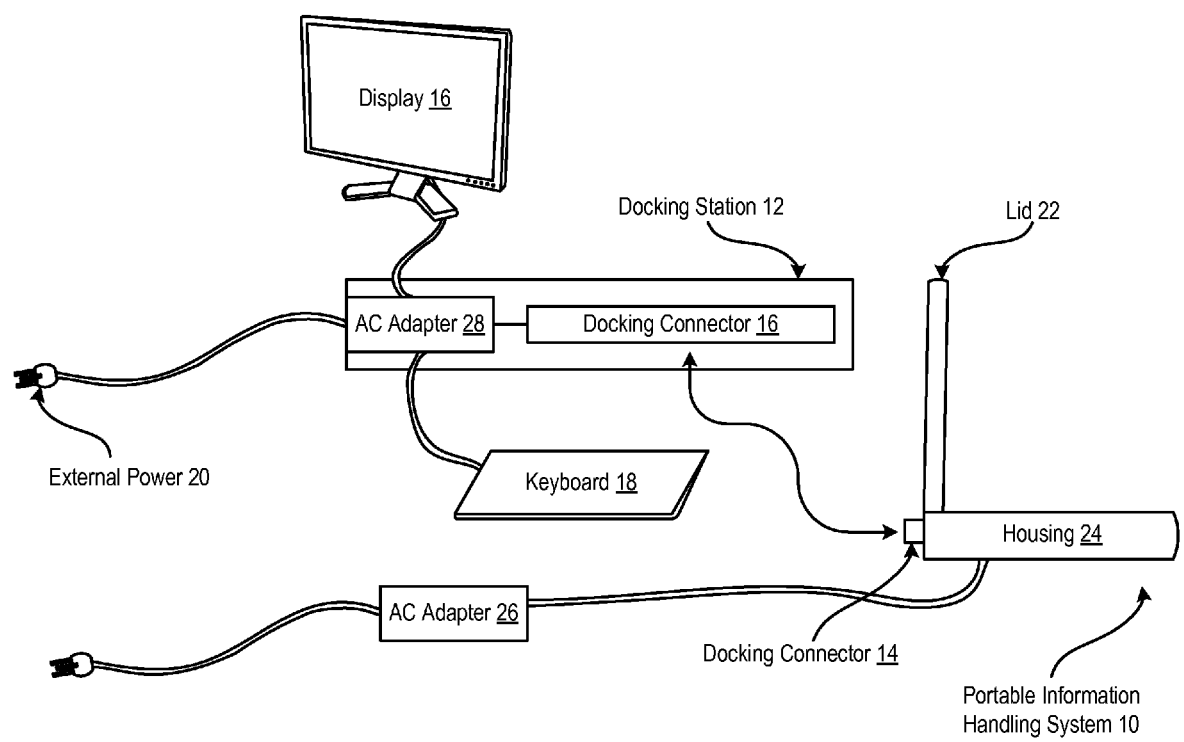
FIG. 1 depicts an information handling system coupling to a docking station.

Referring now to FIG. 1, an information handling system 10 is depicted coupling to a docking station 12. A docking connector 14 on the rear side of portable information handling system 10 aligns with and couples to a docking connector 16 of docking station 12. Docking station 12 serves as a central point for interfacing a variety of peripherals, such as a display 16 and keyboard 18, and external power 20 with a portable information handling system 12. Docking station 12 provides end user interaction with a portable information handling system 10 with the convenience of a desktop system when information handling system 10 couples to docking connector 16. For example, the lid 22 is closed on housing 24 essentially making portable information handling system 10 into a desktop system that interacts with peripherals through docking station 12. The processing components within portable information handling system 10 run on external power 20 provided through docking station 12 instead of a portable AC adapter 26. External power 20 is converted by an AC adapter 28 associated with docking station 12, which provides DC power to information handling system 10 through docking connectors 16 and 14.

Figure 2:
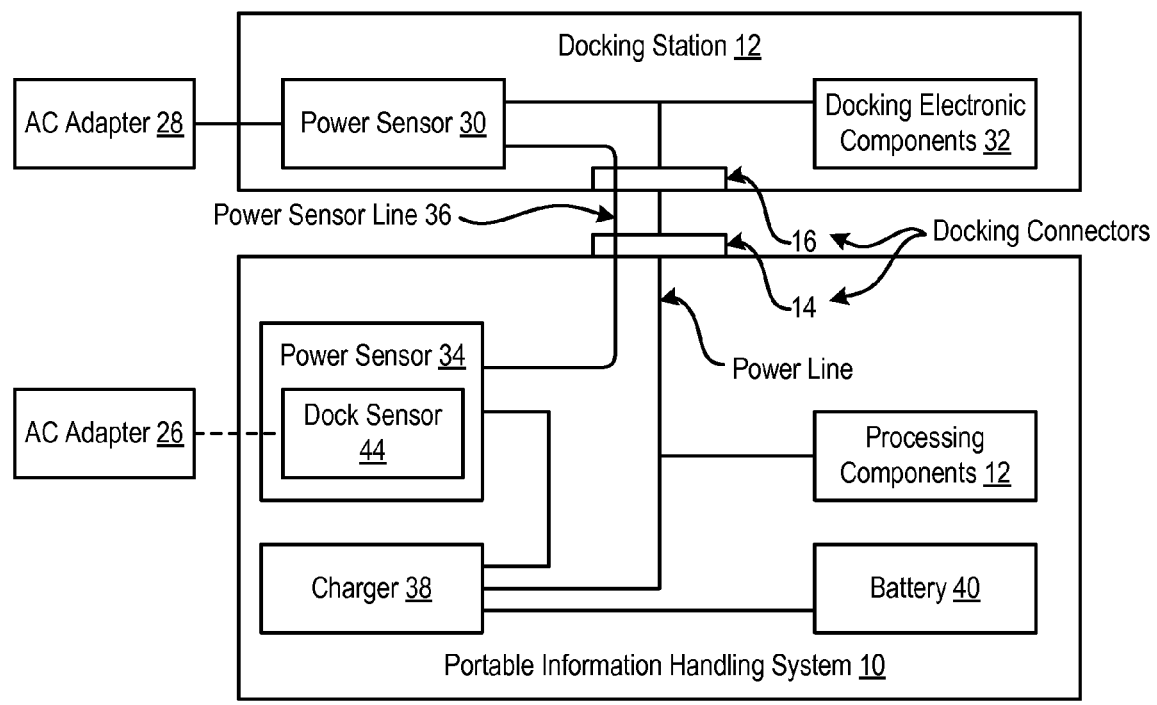
FIG. 2 depicts a block diagram of an information handling system interfaced with a docking station operable to sense power available for communication to the information handling system.

Referring now to FIG. 2, a block diagram depicts an information handling system 10 interfaced with a docking station 12 operable to sense power available for communication to the information handling system 10. DC power is provided from AC adapter 28 to a power sensor 30 of docking station 12 and then to docking station electronic components 32 and docking connectors 14 and 16. Power sensor senses the total available power from AC adapter 28 based on the power used by electronic components 32 and information handling system 10 through docking connectors 14 and 16. The detected available power is communicated from power sensor 30 through docking connectors 14 and 16 to a power sensor 34 integrated in information handling system 10 through a power sense line 36, such as a differential pair. The detected available power is then forwarded to a charger 38 which determines the amount of power to use to charge a battery 40 integrated in information handling system 10. For example, charger 38 considers the power rating of AC adapter 28 minus the power drawn by docking electronic components 32 and information handling system processing components 42 to apply any excess power towards charging of battery 40. By sensing power at docking station 12 and forwarding the sensed value to charger 38 the power rail does not have to provide the power from AC adapter 28 to the power sensor 34 before the power is provided to docking station electronic components 32, thus avoiding the need for multiple power rails across docking connectors 14 and 16. The available power detected by power sensor 30 on docking station 12 is multiplexed to the output of power sensor 34 of information handling system 10 so that charger 38 considers available power whether the available power is from AC adapter 28 of docking station 12 or AC adapter 26 of information handling system 10. A docking sensor 34 interfaces the output of power sensor 30 to charger 38 if docking connectors 14 and 16 are coupled and interfaces power sensor 34 with charger 38 if docking connectors 14 and 16 are not coupled.

Figure 3A:
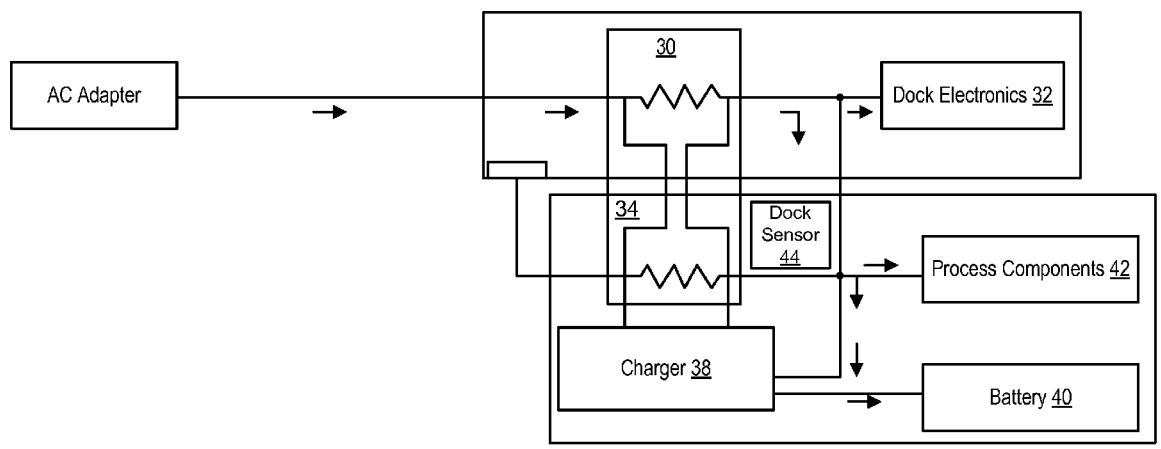
FIG. 3A depicts a circuit diagram of an information handling system interfaced with a docking station operable to sense power available for communication to the information handling system.
Figure 3B:
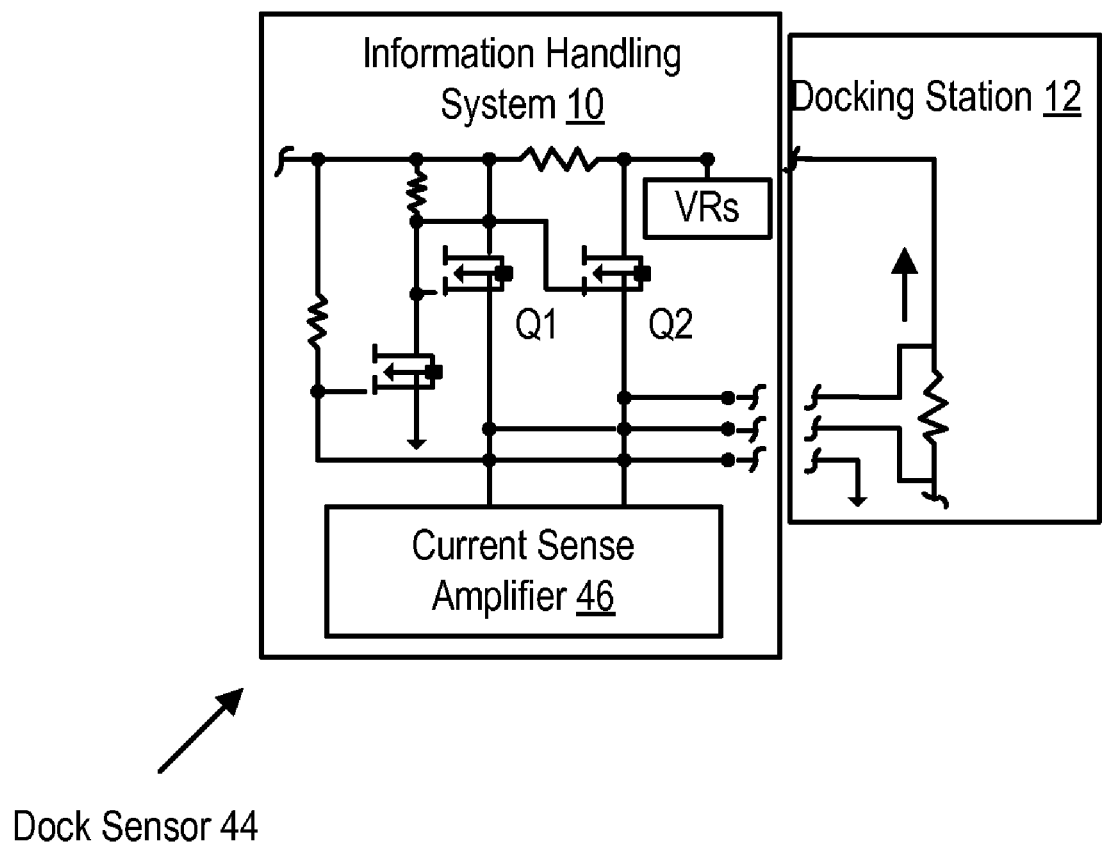
FIG. 3B depicts a circuit diagram of a dock sensor operable to detect coupling of an information handling system and docking station.

Referring now to FIGS. 3A and 3B, a circuit diagram depicts an information handling system 10 interfaced with a docking station 12 operable to sense power available for communication to the information handling system 10. Power sensors 30 and 34 are current sense resistors that measure the power consumed by loads placed on a power source on the circuit located after the sense resistor. Docking sensor 44 is a MOSFET switch configuration that essentially disconnects information handling system 10 from its own power sensor 34 when docked and connects the output of power sensor 30 from docking station 12 in place of power sensor 24. Docking sensor 44 has a ground signal when docked to shut off Q1 and Q2 and an ungrounded signal when not docked. The output of each of power sensor 30 and 34 selectively interfaces with a current sense amplifier 46 of charger 38 based on whether or not information handling system 10 is docked. The architecture by which information handling system 10 charges battery 40 when undocked is unaffected by the architecture used to charge battery 40 when docked; the source for the sensed available power that is provided to current sense amplifier 46 simply switches between the power sensor 30 of docking station 12 when docked and power sensor 34 of information handling system 10 when not docked.

Figure 4:
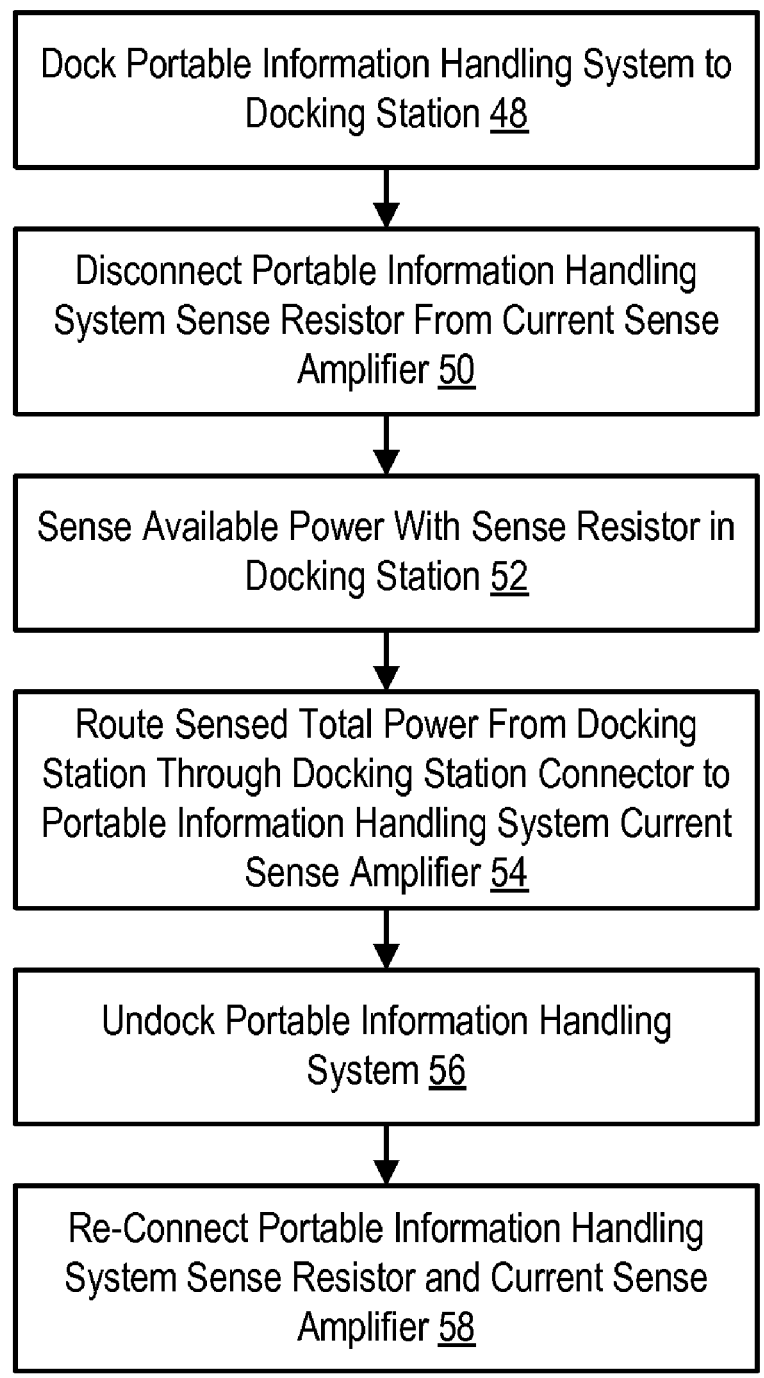
FIG. 4 depicts a flow diagram of a process for charging an information handling system battery based on power available sensed at a docking station.

Referring now to FIG. 4, a flow diagram depicts a process for charging an information handling system battery based on power available sensed at a docking station. The process begins at step 48 with docking of a portable information handling system to a docking station. At step 50, the current sense resistor of the portable information handling system is disconnected from the charger current sense amplifier in response to detection of docking of the information handling system, such as by the grounding of a MOSFET switch. At step 52, the available power is sensed with a current sense resistor integrated in the docking station and communicated to the information handling system through the docking connector. At step 54, the sensed available power from the docking station power source is routed through the docking station connector to the portable information handling system charger current sense amplifier, such as by a differential wire pair. The charger applies the sensed total power to determine power available for charging the battery of the portable information handling system. At step 56, undocking of the portable information handling system from the docking station is detected. At step 58, in response to the detected undocking, the portable information handling system sense resistor and current sense amplifier are reconnected for normal internal operations with the portable information handling systems AC adapter power source.

Although the present invention has been described in detail, it should be understood that various changes, substitutions and alterations can be made hereto without departing from the spirit and scope of the invention as defined by the appended claims.

What is claimed is:

1. An information handling system comprising:
   a housing;
   processing components disposed in the housing and operable to process information;
   a docking connector disposed at the housing and operable to couple to a docking station, the docking connector communicating information and power with the docking station;
   a power sensor disposed in the housing, the power sensor operable to sense available power;
   a charger disposed in the housing and operable to apply power to charge a battery disposed in the housing, the charger interfaced with the power sensor to determine available power for charging the battery; and
   a dock sensor associated with the power sensor, the dock sensor operable to determine that the docking connector is receiving power, to receive available power from the docking connector, to remove the interface of the power sensor and the charger and to provide the available power received from the docking connector to the charger in the place of the available power sensed by the power sensor.

2. The information handling system of claim 1 wherein the power sensor comprises current sense resistors.

3. The information handling system of claim 1 wherein the charger comprises a current sense amplifier.

4. The information handling system of claim 1 wherein the dock sensor comprises a MOSFET switch operable to disconnect the power sensor from the charger.

5. The information handling system of claim 1 further comprising:
   a docking station having a docking connector operable to couple to the information handling system docking connector; and
   a power sensor disposed in the docking station and operable to sense available power at the docking station, the power sensor interfaced with the charger through the docking connector.

6. The information handling system of claim 5 further comprising a differential wire pair interfacing the docking station power sensor with the charger.

7. The information handling system of claim 6 wherein the differential wire pair comprise the output of current sense resistors from the docking station power sensor.

8. The information handling system of claim 1 wherein the dock sensor is further operable to detect a power source coupled directly to the housing and to interface the power sensor and the charger.

9. A method for docking a portable information handling system to a docking station, the method comprising:
   sensing power available at the docking station;
   communicating the sensed power from the docking station to the information handling system; and
   applying the sensed power at the information handling system to determine power applied to charge a battery;
   detecting coupling of the information handling system and the docking station; and
   removing an interface between a power sensor of the information handling system and a battery charger in response to the detecting.

10. The method of claim 9 wherein sensing power available at the docking station further comprises applying power available to the docking station to a current sense resistor circuit.

11. The method of claim 10 wherein communicating the sensed power further comprises communicating the output of the current sense resistor through a differential pair to a charger of the information handling system.

12. The method of claim 9 further comprising charging the battery at the information handling system with power supplied from the docking station.

13. The method of claim 9 wherein removing an interface between a power sensor of the information handling system further comprises removing a current sense resistor interface from a charger.

14. The method of claim 13 wherein applying the sensed power at an information handling system further comprises interfacing the sensed power in the place of removed current sense resistor interface.

15. The method of claim 9 further comprising:
   detecting an uncoupling of the information handling system from the docking station; and
   re-establishing the interface between the power sensor of the information handling system and the battery charger.

16. A system for managing power provided from a docking station to a portable information handling system, the system comprising:
   a power sensor integrated in the docking station and operable to determine power available at the docking station;
   a charger integrated in the portable information handling system and operable to apply the power available to charge a battery integrated in the information handling system within a predetermined power rating;
   an interface from the power sensor through a docking connector to the charger to communicate the power available from the power sensor to the charger; and
   a dock sensor integrated in the information handling system and operable to remove an interface between the information handling system power sensor and charger if the information handling system is coupled to the docking station.

17. The system of claim 16 wherein the interface comprises a differential wire pair.

18. The system of claim 17 wherein the power sensor comprises a current sense resistor circuit.

19. The system of claim 16 further comprising:
   a power sensor integrated in the information handling system and operable to determine power available from a power source connected to the information handling system.

* * * * *